United States Patent
Falatok et al.

(10) Patent No.: US 11,570,955 B1
(45) Date of Patent: Feb. 7, 2023

(54) WOOD CHIPPER WITH NOVEL BRAKING MECHANISM

(71) Applicant: D.A.F., Inc., Spartanburg, SC (US)

(72) Inventors: Daniel R. Falatok, Moore, SC (US); Mark D. Thompson, Chesnee, SC (US); Hugo Whetsell Hayden, Campobello, SC (US); Robert Wyatt, Inman, SC (US)

(73) Assignee: D.A.F., Inc., Spartanburg, SC (US)

( * ) Notice: Subject to any disclaimer, the term of this patent is extended or adjusted under 35 U.S.C. 154(b) by 0 days.

(21) Appl. No.: 17/695,710

(22) Filed: Mar. 15, 2022

Related U.S. Application Data

(62) Division of application No. 16/134,218, filed on Sep. 18, 2018, now Pat. No. 11,297,782.

(60) Provisional application No. 62/559,960, filed on Sep. 18, 2017.

(51) Int. Cl.
| | |
|---|---|
| *B27L 11/02* | (2006.01) |
| *A01G 23/06* | (2006.01) |
| *F16D 65/22* | (2006.01) |
| *F16D 51/48* | (2006.01) |
| *F16D 121/22* | (2012.01) |

(52) U.S. Cl.
CPC ............ *A01G 23/067* (2013.01); *B27L 11/02* (2013.01); *F16D 51/48* (2013.01); *F16D 65/22* (2013.01); *F16D 2121/22* (2013.01)

(58) Field of Classification Search
CPC .......... B27L 11/00; B27L 11/02; B27L 11/04; B27L 11/06; B27L 11/08
See application file for complete search history.

(56) References Cited

U.S. PATENT DOCUMENTS

| | | | |
|---|---|---|---|
| 2,224,757 A | 12/1940 | Wixson | |
| 3,308,860 A | 3/1967 | De Shano | |
| 4,004,262 A | 1/1977 | Grove | |
| 4,058,957 A | 11/1977 | Roseberry | |
| 4,163,586 A | 8/1979 | Snyder | |
| 4,307,558 A | 12/1981 | Bent et al. | |
| 4,409,779 A | 10/1983 | Bent et al. | |
| 5,024,299 A | 6/1991 | Shaw | |
| 5,137,219 A | 8/1992 | Morey | |
| 5,797,251 A | 8/1998 | Busboom | |
| 5,992,587 A | 11/1999 | Maldonado | |
| 6,003,570 A | 12/1999 | Falatok et al. | |
| 6,071,206 A | 6/2000 | Monahan et al. | |
| 6,290,155 B1 * | 9/2001 | Thompson | B02C 18/14 241/101.2 |
| 6,393,813 B1 | 5/2002 | Nowak | |
| 6,397,992 B1 | 6/2002 | Patridge | |
| 7,086,432 B1 | 8/2006 | Falatok | |

(Continued)

OTHER PUBLICATIONS

J.P. Carlton Company, Supplement to Information Disclosure Statement dated Apr. 28, 2021 (all enclosed pages cited).

*Primary Examiner* — Matthew Katcoff

(74) *Attorney, Agent, or Firm* — Nelson Mullins Riley & Scarborough LLP

(57) ABSTRACT

A wood chipper includes an engine and a chipper structure (e.g., a chipper disc or a chipper drum). A drive assembly is disposed between the engine and the chipper structure. The drive assembly comprises at least one pulley. The at least one pulley defines a cylindrical recess therein. A drum brake assembly is configured to engage the cylindrical recess of the at least one pulley.

14 Claims, 4 Drawing Sheets

(56) References Cited

U.S. PATENT DOCUMENTS

| | | | |
|---|---|---|---|
| 7,971,421 B2 | 7/2011 | Goman et al. | |
| 8,628,034 B2 * | 1/2014 | Bouwers | F16H 7/0827 |
| | | | 241/101.2 |
| 8,663,042 B2 | 3/2014 | Bartell et al. | |
| 8,702,561 B2 | 4/2014 | Aronsson | |
| 10,039,239 B2 | 8/2018 | Brand et al. | |
| 10,359,087 B2 * | 7/2019 | Jones | F16D 67/02 |
| 10,721,870 B2 | 7/2020 | Chapon et al. | |
| 2006/0255193 A1 | 11/2006 | Hoekstra et al. | |
| 2007/0051427 A1 | 3/2007 | Wise | |
| 2009/0090434 A1 | 4/2009 | Brand et al. | |
| 2011/0006142 A1 | 1/2011 | Galloway et al. | |
| 2016/0223035 A1 | 8/2016 | Schinkel | |

* cited by examiner

WOOD CHIPPER WITH NOVEL BRAKING MECHANISM

CROSS-REFERENCE TO RELATED APPLICATIONS

This application is a divisional application of co-pending application Ser. No. 16/134,218, filed Sep. 18, 2018, which is based upon and claims the benefit of provisional application Ser. No. 62/559,960, filed Sep. 18, 2017. Both of the aforementioned applications are incorporated fully herein by reference for all purposes.

FIELD OF THE INVENTION

Example embodiments generally relate to stump cutters and wood chippers.

BACKGROUND OF THE INVENTION

Stump cutters, or stump grinders, are used to remove tree stumps, typically by means of teeth on a rotating cutter wheel at a distal end of a grinding arm. The cutter wheel is swept back and forth across a tree stump and lowered at each pass until the stump is removed. The final sweeps may be below ground in order to ensure the entire stump has been eliminated. An example embodiment of a stump cutter is shown in U.S. Pat. No. 6,003,570, which is incorporated fully herein by reference for all purposes.

Similarly, wood chippers are used to reduce plant debris, such as small trees, limbs, etc., into smaller chips. The debris is fed into an infeed chute into contact with the chipper disc or drum. The rotating action of the disc or drum grinds the plant debris into small chips which are then ejected through a discharge chute.

SUMMARY OF THE INVENTION

According to an example embodiment, a wood chipper includes an engine and a chipper structure (e.g., a chipper disc or a chipper drum). A drive assembly is disposed between the engine and the chipper structure. The drive assembly comprises at least one pulley. The at least one pulley defines a cylindrical recess therein. A drum brake assembly is configured to engage the cylindrical recess of the at least one pulley.

According to another example embodiment, a drive assembly includes an internal combustion engine and a plurality of pulleys operably coupled to the internal combustion engine. At least one pulley of the plurality of pulleys defines a cylindrical recess. A drum brake assembly having at least one brake shoe is disposed at least partially in the cylindrical recess of the at least one pulley so that the at least one brake shoe is configured to selectively engage a circumferential surface of the cylindrical recess.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
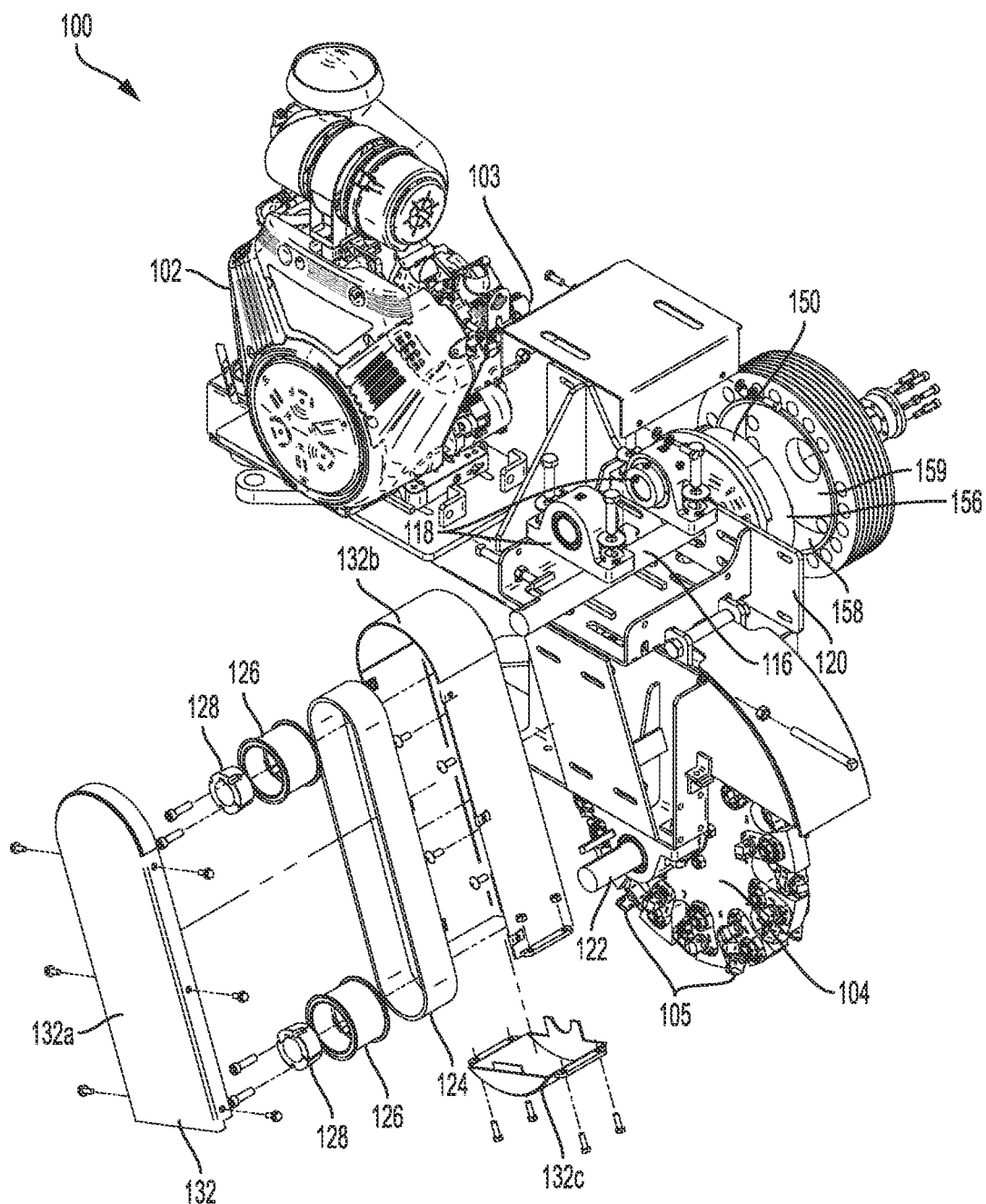
FIG. 1 is a perspective assembly view of a stump cutter assembly in accordance with an embodiment of the present invention.

Repeat use of reference characters in the present specification and drawings is intended to represent same or analogous features or elements of the invention according to the disclosure.

DESCRIPTION OF THE PREFERRED EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Like reference numerals refer to like elements throughout. As used herein, "operable coupling" should be understood to relate to direct or indirect connection that, in either case, enables functional interconnection of components that are operably coupled to each other.

Figure 4:
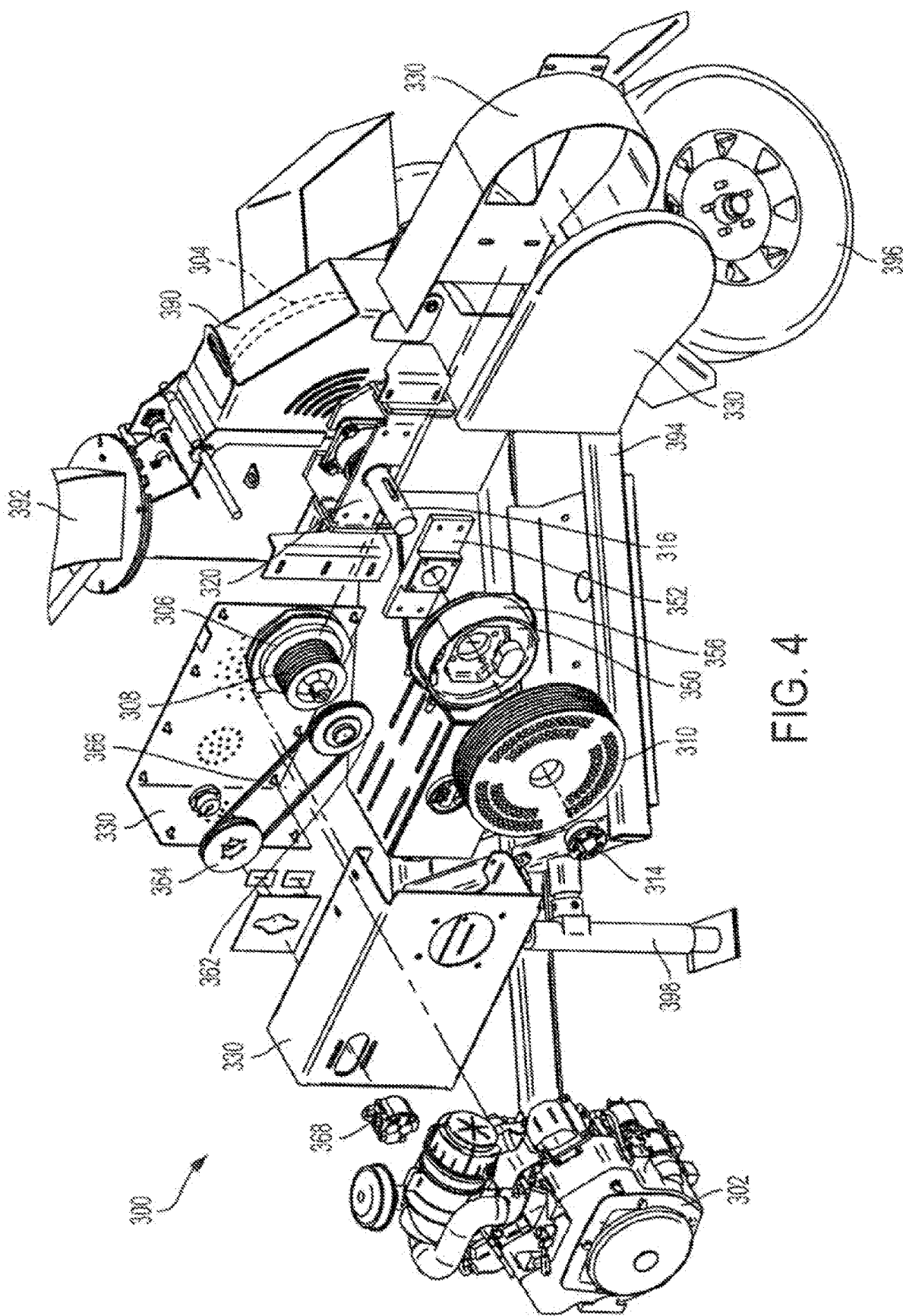
FIG. 4 is a partial perspective assembly view of a wood chipper in accordance with an embodiment of the present invention.

As used herein, terms referring to a direction or a position relative to the orientation of a stump cutter assembly or a wood chipper, such as but not limited to "vertical," "horizontal," "above," or "below," refer to directions and relative positions with respect to the stump cutter assembly's and the wood chipper's orientations in their normal intended operation, as indicated in FIGS. 1 and 4, respectively.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

The term "belt" as used herein refers to an element in the form of a continuous loop that may transfer driving force from one pulley (e.g., a sheave or sprocket) to another.

Figure 2:
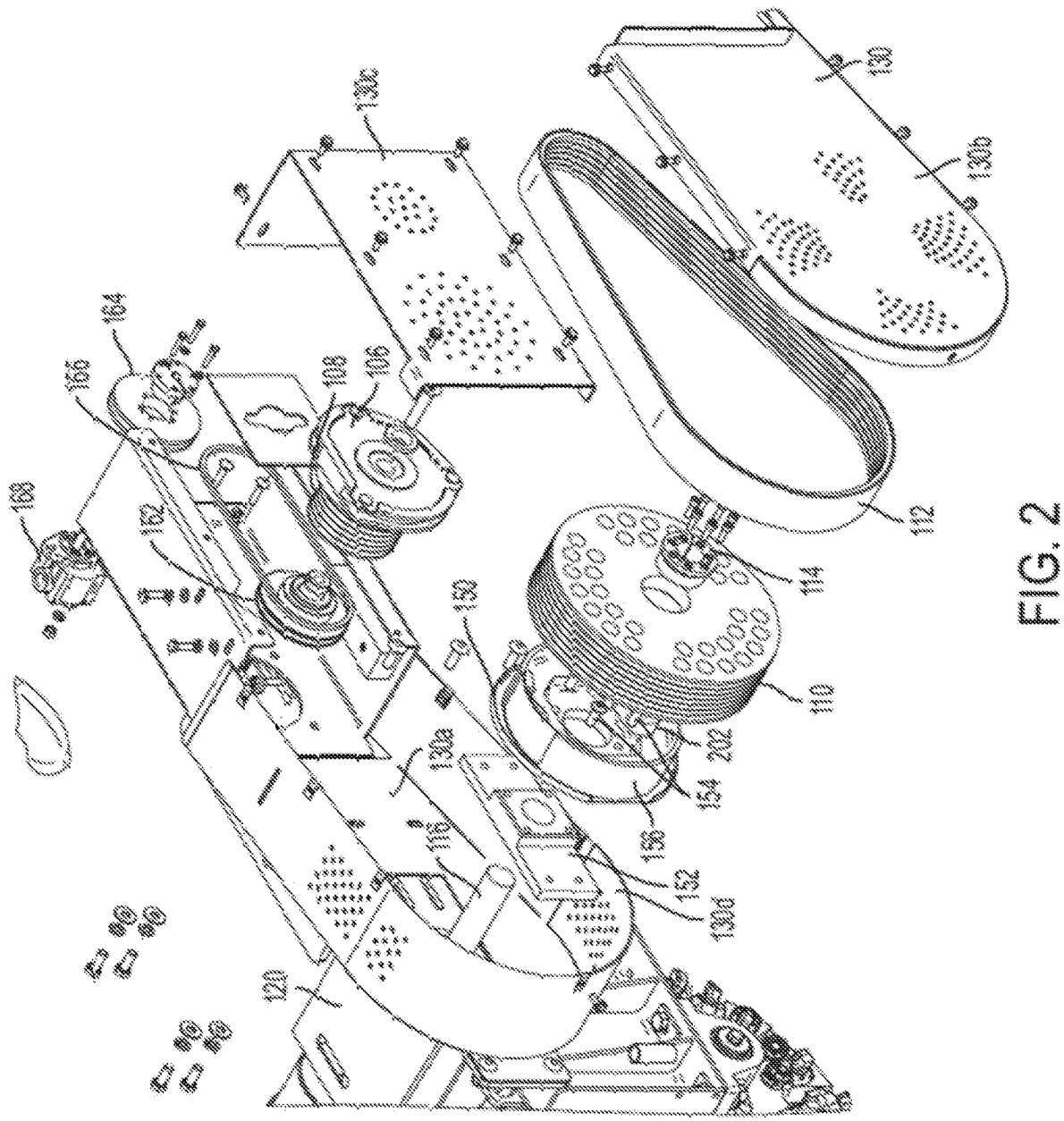
FIG. 2 is a partial perspective assembly view of the stump cutter assembly as in FIG. 1.

FIGS. 1 and 2 illustrate a stump cutter assembly 100 in accordance with an exemplary embodiment, which is a portion of a stump cutter machine. Stump cutter assembly 100 includes an internal combustion (e.g., gasoline or diesel) engine 102 that drivingly couples with a cutter wheel 104, comprising teeth 105, through a drive assembly. Stump cutter assembly 100 is typically attached to a boom (not shown) that pivots about a first axis that is horizontal when the stump cutter is in its intended operational orientation. As a result, cutter wheel 104 (which may also be referred to as a grinding disc) is raisable and lowerable in order to adjust the cutter wheel height in relation to the stump to be removed. In use, cutter wheel 104 is swept laterally across the stump via rotation of the boom about a second axis that is perpendicular to the ground when the stump cutter is in its intended operational orientation.

In various embodiments, certain components of stump cutter assembly 100 remain fixed with respect to the stump cutter base, while other components (e.g., the cutter wheel) are raisable and lowerable with respect to the base. For example, the engine (particularly in smaller machines) may be mounted on top of the boom so that it raises and lowers with the boom. In other embodiments, the engine may be mounted to a horizontal turntable to which the boom is pivotally connected. The stump cutter base is usually supported by one or more wheels of a wheeled chassis to facilitate movement of the stump cutter from place to place. The base typically includes a chassis, a tank for fuel, and operator controls. See, for example, previously-mentioned U.S. Pat. No. 6,003,570 for additional information on various conventional aspects of a stump cutter machine.

As used herein, "drive assembly" includes components that operably couple the engine to engine driven components (e.g., the cutter wheel) as well as braking components. The drive assembly of stump cutter assembly 100 includes a first drive shaft 103 (shown in FIG. 1 but excluded from FIG. 2) that couples engine 102 with a clutch 106. Drive shaft 103 extends from engine 102, through a first hydraulic pump pulley 162, through a pulley, or sheave, 108, and into clutch 106. Pump pulley 162 couples with the drive shaft a via keyed joint and drives, via a hydraulic pump belt 166, a second hydraulic pump pulley 164 that, in turn, couples with a hydraulic pump 168 for controlling movement of the boom and, in some embodiments, driving the wheels of the base.

Clutch 106 includes a first portion that is rotationally fixed to the drive shaft (i.e., so that rotational movement of the shaft causes rotational movement of the first portion of the clutch), regardless of whether the clutch is engaged, and a second portion that becomes rotationally fixed with the first portion when clutch 106 engages. The second portion is rotationally fixed with sheave 108 so that when the clutch engages, thereby coupling the first portion to the second portion, engine 102 drives sheave 108. When clutch 106 disengages, the first portion decouples from the second portion, and engine 102 becomes decoupled from sheave 108. Clutch 106 is an electrically actuated clutch/brake so that, when an operator desires to cause cutter wheel 104 to rotate, the operator engages a switch (e.g., a lever on a handle) that closes a circuit, thereby delivering an electric current (e.g., from an electrical system, such as a 12 VDC system, including a starter battery) to an electromagnet within the clutch, causing the clutch to engage and thereby delivering rotational energy to sheave 108. When the operator desires to halt cutter wheel 104, the operator disengages the switch, thereby removing the electric current from the clutch and causing clutch 106 to disengage engine 102 from sheave 108 and further engaging a brake integrated within clutch 106 that resists the rotational inertia of the second portion of the clutch and, thus, sheave 108. A suitable clutch for use in this application is available from Ogura Industrial Corp. of Somerset, N.J.

Sheave 108, in turn, drives a larger sheave 110 via a multiple v-belt 112 that has a plurality of longitudinal grooves that mate with circumferential ridges in sheaves 108, 110. A self-centering screw clamp bushing 114 extends through a through-hole in sheave 110 and over a second drive shaft 116, thereby coupling sheave 110 with drive shaft 116 so that rotation of the sheave causes corresponding rotation of the drive shaft. Drive shaft 116 rotates within a pair of pillow block bearings 118 that mount via bolts to a structural frame 120. Drive shaft 116 drives a third drive shaft, or jackshaft, 122 via a belt 124 that transfers torque between pulleys 126. Pulleys 126 couple to respective drive shafts 116, 122 via corresponding taper lock bushings 128. As a result, each of the pulleys 126 will rotate with the respective shaft to which it is mounted. Shaft 116 thus drives jackshaft 122 in rotation. Jackshaft 122, in turn, drives cutter wheel 104.

As shown in FIG. 2, a first guard shroud 130 comprises an inner shroud wall 130a, an outer shroud wall 130b, a rear shroud wall 130c, and a curved shroud wall 130d. Each of shroud walls 130b, 130c, and 130d preferably comprises through-holes to provide ventilation and dissipate heat. Shroud 130 further covers moving components, including clutch 106, sheaves 108, 110, belt 112, and a portion of drive shaft 116. Similarly, a second shroud 132 (FIG. 1) that covers pulleys 126 and belt 124 includes a side wall 132a, a curved wall 132b, and an end cap 132c.

An electrically-actuated drum brake assembly 150 is mounted to a brake mount 152 that is, in turn, mounted to structural frame 120 (e.g., via screws 154). Drum brake assembly 150 comprises internal components typically found in an electric drum brake (e.g., brake shoes 156, springs, backing plate, electromagnetic actuator, actuator arm, etc.). Drum brake assembly 150 is disposed at least partially in a cylindrical recess in sheave 110. The cylindrical recess of sheave 110 has a cylindrical interior surface 158 (FIGS. 1 and 3) that is configured to be engaged by brake assembly 150 so that sheave 110 acts as a drum for brake assembly 150. That is, cylindrical interior surface 158 has a diameter such that it is configured to be engaged by at least one of brake shoes 156 of drum brake assembly 150 when drum brake assembly 150 actuates. When drum brake assembly 150 deactuates, brake shoes 156 disengage from cylindrical interior surface 158.

Brake assembly 150 is housed at least partially (and preferably substantially entirely) within sheave 110, thereby providing a compact configuration in a direction along to the sheave's axis of rotation. As shown, a plurality of holes 160 may be defined in the side face of sheave 110 to facilitate dissipation of heat from brake assembly 150. In a further embodiment, a separate drum mounts to a hollow interior of sheave 110 so that the drum rotates with the sheave. Thus, if drum brake assembly 150 stops the drum, sheave 110 correspondingly stops.

As described above, in operation, an operator engages a switch to cause engine 102 to drive cutter wheel 104. The switch closes a circuit between the stump cutter's electrical system and clutch 106, thereby causing the clutch to engage. In some embodiments, the switch is a "dead-man's switch" that includes a spring-loaded lever that, when released, interrupts the electrical potential to the clutch, thereby disengaging the clutch and engaging the clutch's integrated brake. In this way, the operator must be holding the handle in order to cause the cutter wheel to rotate. When the operator releases the handle, the cutter wheel stops.

Further, when the operator releases the switch, the switch closes a circuit between the electrical system and drum brake assembly 150, thereby causing drum brake assembly 150 to engage with cylindrical surface 158 of sheave 110.

When the operator actuates the switch, the switch opens the circuit between electrical system and drum brake assembly 150, thereby causing the drum brake assembly to disengage from cylindrical interior surface 158 of sheave 110 and allow sheave 110 to rotate freely.

Figure 3:
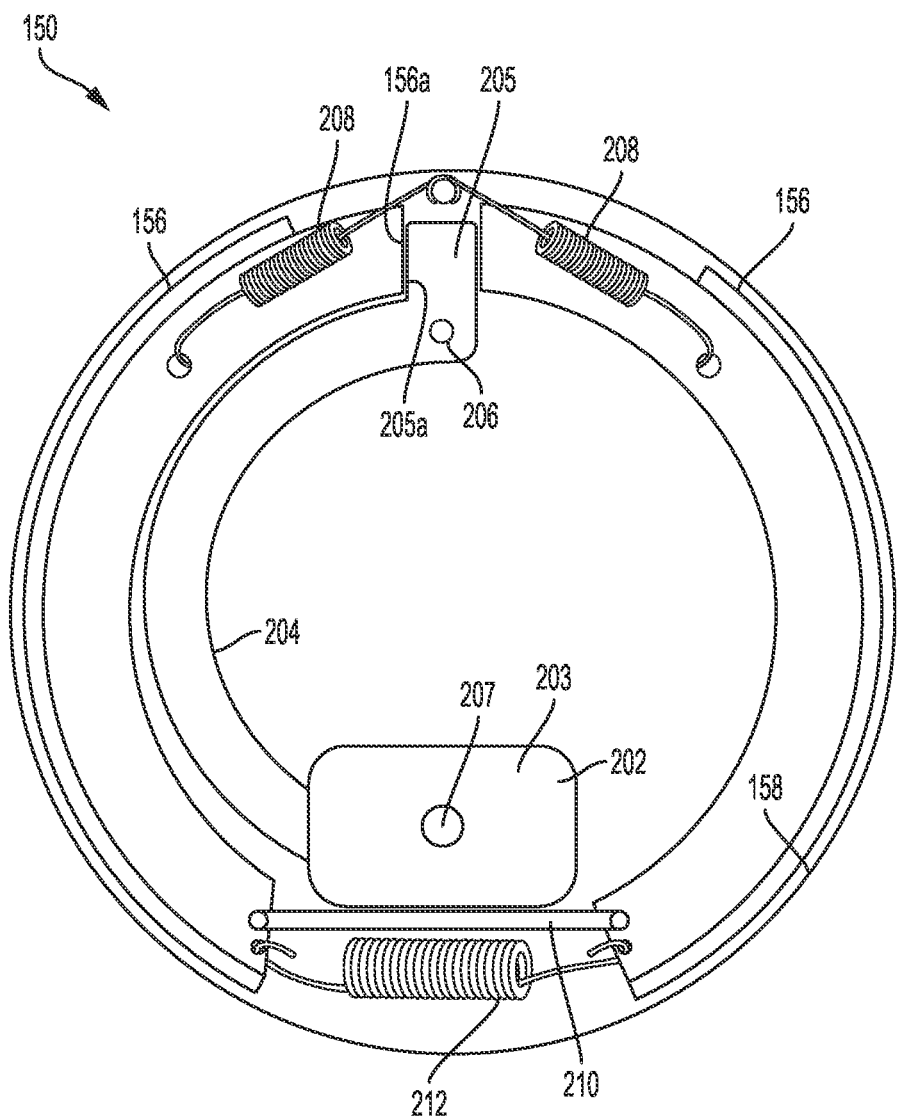
FIG. 3 is a diagrammatic representation of an electrically actuated drum brake for use in the stump cutter assembly as in FIG. 1.

FIG. 3 shows additional detail regarding the structure of drum brake assembly 150 and its actuation in accordance with an embodiment of the present disclosure. A voltage provided to an electromagnet within an electromagnetic actuator 202 causes the electromagnet to create a magnetic field, thereby attracting the electromagnet towards a ferromagnetic flat interior surface of the drum (in this embodiment, an interior face 159 (FIG. 1)) that is perpendicular to the cylindrical interior surface 158. With respect to the orientation in FIG. 3, the electromagnetic attraction pulls electromagnetic actuator 202 up and out of the page. A brake pad 203, integral to electromagnetic actuator 202 and disposed between the electromagnet and the flat interior surface, engages the flat interior surface. Contact friction between the brake pad and the flat interior surface pulls the electromagnetic actuator tangential to the rotational motion of the drum, or sheave 110 (FIG. 1), at its contact interface with the electromagnetic actuator. Electromagnetic actuator 202 slides along a pin 207 at a distal end of a curved actuator arm 204 so that the electromagnetic actuator can slide parallel to the axis of pin 207 (i.e., into and out of the page in FIG. 3) with respect to the actuator arm but is otherwise fixed to actuator arm 204.

A proximal, opposite end of the actuator arm is pivotally attached to a backing plate about a pin 206. The frictional force between the electromagnetic actuator and the flat interior surface of the drum brake causes the electromagnetic actuator to move in the direction of the frictional force and therefore pulls the distal end of the actuator arm via pin 207, thereby pivoting actuator arm 204 about pin 206. The actuator arm contacts one of brake shoes 156 at a contact interface between the actuator arm and the brake shoe and forces the brake shoe towards and against the drum (i.e., sheave 110 at cylindrical surface 158). That is, a top portion 205 of actuator arm 204, extending beyond pin 206 in a direction opposite electromagnetic actuator 202, pivots to cause a side surface of top portion 205 to press against an opposing side portion of brake shoe 156. For example, as actuator arm 204 pivots counterclockwise in the orientation of FIG. 1, side surface 205*a* of top portion 205 presses against opposing side surface 156*a* of brake shoe 156. When the switch opens the circuit that provides electrical potential to the electromagnet, an associated one of retraction springs 208 pulls the engaged brake shoe from the drum, thereby disengaging the brake. An adjustment arm 210 and corresponding spring 212 may be used to set a gap between brake shoes 156 and cylindrical surface 158 to ensure proper engagement.

In a further embodiment, the brake is hydraulically actuated. In such an example, disengagement of the throttle causes pressurized hydraulic fluid to enter into a hydraulic cylinder in the drum brake assembly, which, in turn, acts against the drum brake springs to apply the brake shoes to cylindrical interior surface 158 (FIG. 1). When the hydraulic pressure is released, the drum brake springs cause the brake shoes to disengage from the interior surface 158.

Referring again to FIGS. 1 and 2, in an embodiment, cutter wheel 104 weighs several hundred pounds (e.g., approximately 300 pounds). Thus, the cutter wheel has substantial rotational inertia when rotating at full speed. In some embodiments, belt 124 is a cog belt and, therefore, cannot slip against pulleys 126. For this reason, and due to the cutter wheel's rotational inertia, abrupt stops can cause wear to the belt. Thus, the amount or degree to which braking force from drum brake assembly 150 is applied to the drum (i.e., the force of brake shoes 156 against interior surface 158) may be varied by the voltage provided to the electromagnetic actuator in order to alter the abruptness of the stops. In an embodiment, a resistor R (e.g., a 10 ohm or a 15 ohm resistor) is installed in series between the voltage source (e.g., 12 VDC source) and brake assembly 150. The resistor lowers the voltage applied to the brake, thereby reducing the electromagnetic attraction between the electromagnetic actuator 202 (FIG. 3) and surface 162. This, in turn, reduces the braking force and, thus, the rate at which the cutter wheel slows. A potentiometer may be used in design of the stump cutter to provide a variable resistance in order to determine an ideal resistance for an ideal stopping rate for a given embodiment.

Referring to FIG. 4, a wood chipper 300 employs a drum brake within a sheave in accordance with an embodiment of the present disclosure. Wood chipper 300 includes an engine 302 that drives a rotating chipper implement, such as a chipper (grinding) disk or a chipper drum. In this case, wood chipper 300 is equipped with a chipper disc 304 (shown in part in phantom in FIG. 4) although embodiments utilizing a chipper drum are also contemplated. The chipper implement is located inside of a housing 390 and chips wood fed through an infeed chute (on the opposite side of housing 390 from the side shown in FIG. 4). The chipper implement blows the wood chips as they are produced out through a discharge chute (partially shown at 392). In this embodiment, discharge chute 392 is rotatable about a vertical axis so that the discharge direction can be varied as necessary or desired. Wood chipper 300 further includes a base 394 that is supported by one or more wheels 396 and one or more retractable legs 398. Certain conventional aspects of a wood chipper can be understood with reference to U.S. Pat. No. 5,137,219 and U.S. Published App. No. 2011/0006142A1, both of which are incorporated fully herein by reference for all purposes.

The drive assembly of wood chipper 300 includes components corresponding to similar drive assembly components of stump cutter assembly 100 (FIG. 1). It should therefore be understood that reference numerals beginning with a '3' should be functionally and structurally similar to those of the stump cutter assembly beginning with '1' of matching subsequent numerals (e.g., sheave 308 is analogous in function and structure to sheave 108 above). Therefore, the discussion of the components with respect to the stump cutter is incorporated by reference for the disclosure of the wood chipper.

Engine 302 couples with a clutch 306 via a drive shaft (not shown) that extends from engine 302 through a first hydraulic pump pulley 362, through a sheave 308, and into clutch 306. Pump pulley 362 is connected, via a belt 366, to a second hydraulic pump pulley 364 that, in turn couples with a hydraulic pump (e.g., for driving feed wheels).

Similar to the stump cutter embodiment described above, sheave 308 drives a larger sheave 310 via a multiple v-belt (not shown) that has a plurality longitudinal grooves that mate with circumferential ridges in sheaves 308, 310. A self-centering screw clamp bushing 314 extends through a through-hole in sheave 310 and over a jackshaft 316, thereby coupling sheave 310 with jackshaft 316 so that rotation of the sheave causes corresponding rotation of the jackshaft. Jackshaft 316 couples with the chipper disk 304 via a keyed joint. A guard shroud 330 covers a plurality of moving components.

An electrically-actuated drum brake assembly 350 mounts to a brake mount 352 that, in turn, mounts to a structural frame 320. Drum brake assembly 350 comprises typical components found in an electric drum brake (e.g., brake shoes 356, springs, backing plate, electromagnetic actuator, actuator arm etc.) except for the drum itself. Drum brake assembly 350 is disposed at least partially in a cylindrical recess in sheave 310. The cylindrical recess of sheave 310 has a cylindrical interior surface that acts as an engagement surface of a drum to engage drum brake assembly 350, as explained in detail above for the stump cutter embodiment. Actuation of brake assembly 350 is otherwise similar to brake assembly 150 described above.

While one or more preferred embodiments of the invention are described above, it should be appreciated by those skilled in the art that various modifications and variations can be made in the present invention without departing from the scope and spirit thereof. For example, while the disclosed embodiments are directed to use with a stump cutter with a direct drive from a combustion engine, the various embodiments could be modified for use with hydraulic or electric motors. Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

The following is claimed:

1. A wood chipper comprising:
   an engine;
   a chipper implement;
   a drive assembly between the engine and the chipper implement, wherein the drive assembly comprises at least one pulley, and wherein the at least one pulley defines a cylindrical recess therein; and
   a drum brake assembly configured to engage the cylindrical recess of the at least one pulley.

2. The wood chipper of claim 1, wherein said at least one pulley comprises a first pulley attached to an output shaft of the engine and a second pulley, said second being connected to said first pulley by a first belt so as to be rotatably driven by the first pulley.

3. The wood chipper of claim 2, wherein the first pulley is attached to the output shaft of the engine via a clutch and the second pulley defines the cylindrical recess.

4. The wood chipper of claim 3, further comprising:
   a third pulley attached to the output shaft of the engine;
   a fourth pulley coupled to a hydraulic pump; and
   a second belt interconnecting said third pulley and fourth pulley so that said third pulley will rotatably drive said fourth pulley.

5. The wood chipper of claim 1, wherein the first belt comprises a multiple v-belt.

6. The wood chipper of claim 1, wherein the drum brake assembly is electrically actuated.

7. The wood chipper of claim 6, wherein the drum brake assembly comprises a pair of brake shoes.

8. The wood chipper of claim 1, further comprising a spring-loaded switch that is configured to actuate the brake when the spring-loaded switch is released by an operator.

9. The wood chipper of claim 1, further comprising an infeed chute through which wood is fed and a discharge chute from which wood chips are discharged.

10. The wood chipper of claim 9, wherein said discharge chute is rotatable about a vertical axis.

11. The wood chipper of claim 6, further comprising a switch and wherein the drum brake assembly includes an electromagnet and further wherein at least one brake shoe is configured to engage a circumferential surface of the cylindrical recess upon a closing of the switch that provides an electrical current to the electromagnet in the drum brake assembly.

12. The wood chipper of claim 11, wherein the at least one brake shoe comprises a pair of brake shoes.

13. The wood chipper of claim 1, wherein the chipper implement comprises a chipper disc.

14. The wood chipper of claim 1, wherein the engine comprises an internal combustion engine.

* * * * *